United States Patent
Henry et al.

(10) Patent No.: US 6,543,485 B2
(45) Date of Patent: Apr. 8, 2003

(54) WATERHAMMER SUPPRESSION APPARATUS

(75) Inventors: Robert E. Henry, Naperville, IL (US); James M. Farrington, Lockport, IL (US); Joseph M. Kalebich, Channahon, IL (US)

(73) Assignee: Westinghouse Electric Co. LLC, Pittsburgh, PA (US)

( * ) Notice: Subject to any disclaimer, the term of this patent is extended or adjusted under 35 U.S.C. 154(b) by 0 days.

(21) Appl. No.: 10/084,024

(22) Filed: Feb. 25, 2002

(65) Prior Publication Data

US 2002/0117223 A1 Aug. 29, 2002

Related U.S. Application Data

(60) Provisional application No. 60/271,610, filed on Feb. 26, 2001.

(51) Int. Cl.⁷ .............................................. F16L 55/04
(52) U.S. Cl. .................................... 138/30; 138/26
(58) Field of Search ................................. 138/30, 26

(56) References Cited

U.S. PATENT DOCUMENTS

| | | | |
|---|---|---|---|
| 2,497,020 A | * 2/1950 | Singer ......................... | 138/26 |
| 2,701,583 A | * 2/1955 | Rux ............................. | 138/26 |
| 2,968,318 A | * 1/1961 | Bauman ....................... | 138/26 |
| 3,532,125 A | * 10/1970 | Everett et al. ................ | 138/30 |
| 4,032,265 A | * 6/1977 | Miller .......................... | 138/30 |
| 4,367,786 A | * 1/1983 | Hafner et al. ................. | 138/30 |
| 4,823,844 A | * 4/1989 | Bartholomew ............... | 138/30 |
| 4,897,906 A | * 2/1990 | Bartholomew ............... | 138/30 |
| 5,218,987 A | 6/1993 | Heil | |
| 5,303,843 A | 4/1994 | Zink et al. | |

* cited by examiner

Primary Examiner—James Hook

(57) ABSTRACT

Phenomena in water systems caused by hydraulic transients known as "waterhammer" are suppressed by surge vessels containing crushable, cellular, polymeric materials such as polyethylene, polyurethane and polystyrene foam. The foam may be one piece or in the form of several separate particles contained in nylon netting. A water permeable screen is located between a nozzle connection and the cellular polymeric materials for retaining the materials in the surge vessels as the water flows into and out of the vessels. The foam occupies much of the volume in the surge vessels not occupied by the water and the gas contained in the foam can not readily dissolve into the water.

6 Claims, 1 Drawing Sheet

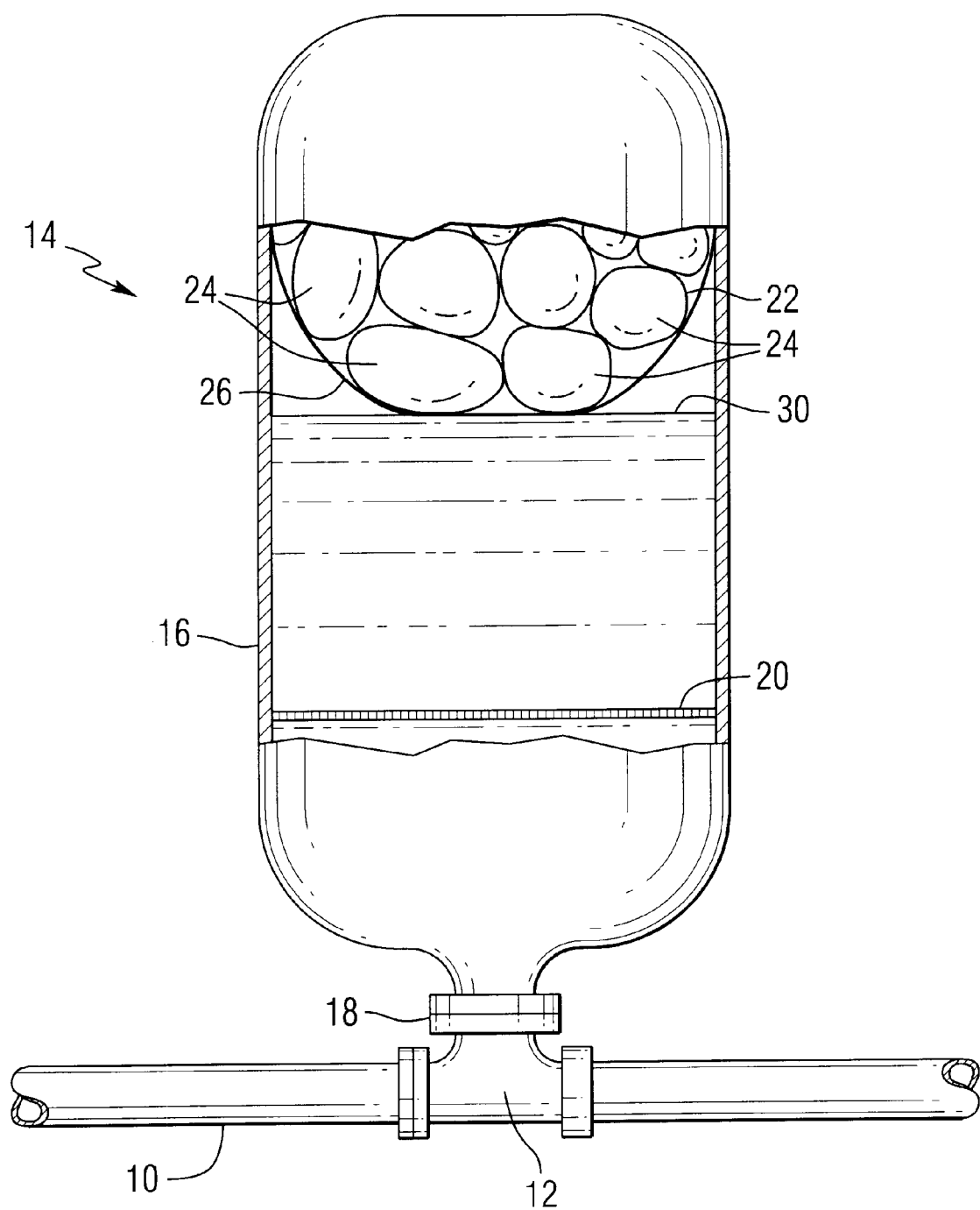

WATERHAMMER SUPPRESSION APPARATUS

BACKGROUND OF THE INVENTION

The invention relates a fluid system phenomena known as "waterhammer" and more particularly to apparatus for suppressing waterhammer in operating water systems such as municipal water systems and process and utility service water systems in nuclear power and other industrial plants.

Surge suppressors are commonly used in water systems to absorb hydraulic transients causing waterhammer, which may occur when pumps startup or shut down or when valves rapidly open or close. See, in this regard, U.S. Pat. No. 5,218,987 to Heil, which discloses a surge suppressor for protecting fire hydrant systems. Such surge suppressors are essentially surge vessels (which may be standpipes) hydraulically connected with the water systems for absorbing the forces of hydraulic transients. The surge vessels comprise water filled portions which may or may not be separated from gas filled portions by flexible, substantially watertight membranes or bladders. For those suppressors using bladders, the hydraulic transients in the water in the systems cause the water in the surge vessels to act on the membranes and compress the gas (which may be compressed air) behind the membranes and thereby absorb the energy. See, also, U.S. Pat. No. 5,303,843 to Zinc et al., which illustrates the use energy absorbing materials disposed in compartments isolated by rupture disks from fluid containing compartments in railroad cars to absorb the energy generated in the fluid in the course of an accident.

Operators of water systems are concerned about the reliability of flexible membranes and bladders in water systems, which must function over a wide range of conditions. One concern for those suppressors that do not use bladders is that significant amounts of the gas contained in the surge suppressors may dissolve into the water over time and the surge suppressors might not then retain their capacity to absorb the hydraulic transients. Another concern is that the gas originally in the surge vessel may dissolve into the water and then may contribute to cavitation or have other adverse affects.

SUMMARY OF THE INVENTION

It is an object of the present invention to suppress water hammer in water systems without requiring the use of flexible membranes or bladders to separate the water and gas in surge suppressors. It is a further object to reduce the amount of gas in surge suppressors available to dissolve into the water.

With these objects in view, the present invention resides in apparatus for suppressing water hammer in a water system. The apparatus comprises a surge vessel having a permanently open nozzle for hydraulically connecting with the water system, a cellular polymer in the surge vessel and a water permeable screen spaced from the nozzle separating the nozzle and the cellular polymer and retaining the cellular polymer in the surge vessel. Preferably, the polymer is a plastic foam (or cellular plastic) comprised of polyethylene, polyurethane or polystyrene. In one embodiment of the present invention, separate cellular polymer particles are contained in netting.

Advantageously, a hydraulic transient in a water system sufficient to generate a waterhammer condition will at least partially crush the cellular polymer, which will absorb the energy in the water. Also, the polymers (and entrapped gases therein) will occupy much of the volume of the surge vessels not occupied by the water so that less gas is available to dissolve into the water.

BRIEF DESCRIPTION OF THE DRAWING

The invention as set forth in the claims will become more apparent from the following detailed description of a preferred embodiment thereof shown, by way of example only, in the accompanying drawing FIGURE, which illustrates a partially broken away side view of apparatus embodying the present invention.

DESCRIPTION OF THE PREFERRED EMBODIMENT

Referring now to the drawing FIGURE in detail, there is shown a pipe 10 having a tee 12, which represents a water system such as a municipal water system or a process or service water system in a nuclear power plant or other industrial facility, and apparatus 14 for suppressing water hammer in the water system. The apparatus 14 includes a surge vessel 16 with a nozzle 18 that can be piped to the tee 12. As shown, the surge vessel 16 is vertically over the connection with the tee 12. Importantly, the nozzle 18 is permanently open, i.e., it does not have a valve, rupture disc or other device for isolating the vessel 16 from the water system so that water in the pipe 10 will always communicate with water in the surge vessel 16 through the nozzle 18. In other embodiments of the present invention, the surge vessel 16 may be disposed vertically under the tee 12 or at intermediate angles thereto, in which case the nozzle 18 may need to be extended into the interior portions of the surge vessel 16. The surge vessel 16 can be a new vessel or an existing vessel. A flexible membrane or bladder may be permitted to remain intact in an existing vessel but it would not be necessary. In addition, the surge vessel 16 can be a vertical pipe standoff.

A water permeable screen 20 is disposed in the surge vessel 16 and spaced from the nozzle 16 by the distance of at least one nozzle diameter. The screen 20 may be attached to the wall of the surge vessel 16 by welding, brackets or by other suitable mechanical attachments. In a preferred embodiment of the present invention, the screen is fabricated of a corrosion resistant metal such as a stainless steel composition.

A polymeric material 22 having closed cells is provided in the surge vessel 16 and separated from the nozzle 18 by the water permeable screen 20. Importantly, the water permeable screen 20 retains the polymeric material 20 in the surge vessel 16 while permitting water to freely move into and out of the surge vessel 16. The cellular polymer 22 is preferably a foamed plastic (or cellular plastic) material such as a polyethylene, polyurethane or polystyrene. The drawing FIGURE shows an embodiment wherein a plurality of separate polymer pieces 24 are contained in a netting 26 (which is nylon in a preferred embodiment) to occupy a substantial portion of the volume in the surge vessel 16 over the water. Advantageously, the closed cell nature of such foams can retain air or other gas in closed pockets for very long periods of time. A preferred foam 22 is an expanded, cellular polystyrene "popcorn" sold for use as packing materials under the trademark STYROFOAM® by the Dow Chemical Company.

As is shown in the drawing FIGURE, the separate polymeric pieces 26 contained in a netting 26 are on the surface 30 of the water in the surge vessel 16. The pieces 26 may or may not be raised against the top of the surge vessel 16 by the water. Advantageously, the polymeric pieces 26 can be substantially immobilized against the top of the surge vessel 16 and at partially submerged in the water without crushing the polymeric pieces 26. Then, while the polymeric pieces 26 are held against the top of the surge vessel 16, the pieces 26 may be at least partially crushed in absorbing substantial forces caused by a hydraulic transient and thereby suppress any waterhammer that would otherwise occur in the water system 10.

While a present preferred embodiment of the present invention has been shown and described, it is to be understood that the invention may be otherwise variously embodied within the scope of the following claims of invention.

What is claimed is:

1. Apparatus for suppressing water hammer in a water system, comprising:

a surge vessel having a permanently open nozzle for hydraulically connecting with the water system;

cellular polymer particles contained in nylon netting in the surge vessel; and a water permeable screen spaced from the open nozzle, the water permeable screen separating the cellular polymer from the open nozzle and retaining the cellular polymer in the surge vessel.

2. The apparatus of claim 1, wherein the cellular polymer particles are comprised of polyethylene.

3. The apparatus of claim 1, wherein the cellular polymer particles are of polyurethane.

4. The apparatus of claim 1, wherein the cellular polymer particles are comprised of polystyrene.

5. The apparatus of claim 1, wherein the cellular polymer particles retain a gas in closed cells.

6. The apparatus of claim 1, wherein the screen is comprised of stainless steel.

* * * * *